(12) United States Patent
Yao et al.

(10) Patent No.: US 10,991,945 B2
(45) Date of Patent: Apr. 27, 2021

(54) ELECTRODE ACTIVE MATERIAL FOR NONAQUEOUS SECONDARY BATTERIES, AND NONAQUEOUS SECONDARY BATTERY USING SAME

(71) Applicant: National Institute of Advanced Industrial Science and Technology, Tokyo (JP)

(72) Inventors: Masaru Yao, Osaka (JP); Hisanori Ando, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 194 days.

(21) Appl. No.: 16/462,653

(22) PCT Filed: Nov. 24, 2017

(86) PCT No.: PCT/JP2017/042235
§ 371 (c)(1),
(2) Date: May 21, 2019

(87) PCT Pub. No.: WO2018/097250
PCT Pub. Date: May 31, 2018

(65) Prior Publication Data
US 2020/0067095 A1 Feb. 27, 2020

(30) Foreign Application Priority Data
Nov. 24, 2016 (JP) .............................. JP2016-227853

(51) Int. Cl.
*H01M 4/60* (2006.01)
*H01M 10/0525* (2010.01)

(52) U.S. Cl.
CPC ....... *H01M 4/608* (2013.01); *H01M 10/0525* (2013.01)

(58) Field of Classification Search
CPC .......................... H01M 4/608; H01M 10/0525
(Continued)

(56) References Cited

U.S. PATENT DOCUMENTS

| 5,436,353 A | 7/1995 | Chetcuti |
| 5,492,652 A | 2/1996 | Chetcuti |
| 2017/0229738 A1 | 8/2017 | Yao et al. |

FOREIGN PATENT DOCUMENTS

| JP | H06172343 A | 6/1994 |
| JP | 2012/155884 A | 8/2012 |
| WO | WO-2016/024594 A1 | 2/2016 |

OTHER PUBLICATIONS

Ma et al "A Sulfur Heterocyclic Quinone Cathode and a Multifunctional Binder for a High-Performance Rechargeable Lithium-Ion Battery" Angewandte Chemie International Edition vol. 55, pp. 6428-6432.

(Continued)

*Primary Examiner* — James M Erwin
(74) *Attorney, Agent, or Firm* — Cesari & McKenna, LLP

(57) ABSTRACT

An electrode active material for non-aqueous secondary batteries containing a compound represented by formula (1) is a material that is less likely to dissolve in an electrolyte
(Continued)

during charge and discharge, and that exhibits an excellent discharge capacity and excellent charge-and-discharge cycle characteristics: the compound represented by formula (1)

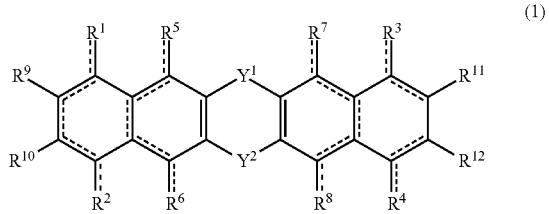

(1)

wherein $Y^1$ and $Y^2$ are identical or different and represent an oxygen atom, a sulfur atom, or a selenium atom, $R^1$ to $R^8$ are identical or different and represent an oxygen atom or a group represented by —OLi, $R^9$ to $R^{12}$ are identical or different and represent a hydrogen atom or an organic group, and bonds that are each represented by a solid line and a dashed line indicate a single bond or a double bond.

20 Claims, 3 Drawing Sheets

(58) Field of Classification Search
USPC .................................................. 429/209
See application file for complete search history.

(56) References Cited

OTHER PUBLICATIONS

Yao et al "Polycyclic Quinone Fused by a Sulfur-Containing Ring as an Organic Positive-Electrode Material for Use in Rechargeable Lithium Batteries" Energy Procedia vol. 89, pp. 222-230, 2016.

ELECTRODE ACTIVE MATERIAL FOR NONAQUEOUS SECONDARY BATTERIES, AND NONAQUEOUS SECONDARY BATTERY USING SAME

CROSS-REFERENCE TO RELATED APPLICATIONS

This application is the National Stage of International Application No. PCT/JP2017/042235, filed Nov. 24, 2017, which claims the benefit of priority of Japanese Patent Application No. 2016-227,853, filed Nov. 24, 2016, the contents of both being incorporated by reference in their entirety for all purposes.

TECHNICAL FIELD

The present invention relates to an electrode active material for non-aqueous secondary batteries and a non-aqueous secondary battery containing the electrode active material.

BACKGROUND ART

Non-aqueous secondary batteries, such as lithium-ion secondary batteries, are used in a variety of electric power sources. Studies have been conducted on applications of non-aqueous secondary batteries in electric vehicles, and there is demand for safer battery materials with a higher energy density. Currently, lithium secondary batteries utilize an inorganic material containing a rare heavy metal, such as lithium cobalt oxide ($LiCoO_2$), for the cathode material (cathode active material) and a carbon material, such as graphite, for the anode material. In particular, such inorganic materials containing a rare heavy metal used in cathodes are resource-constrained, and there are also concerns about their environmental impact.

Organic materials with redox activity have attracted attention as a rare metal-free, more environment-friendly material. One of such potential materials is 1,4-benzoquinones, which are known to undergo two-electron-transfer redox reaction:

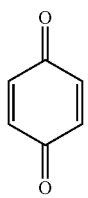

However, due to their high sublimation tendency, 1,4-benzoquinones are not easily formed into an electrode.

Cycle characteristics are already known to improve when condensation occurs at redox sites, and a known example is the charge and discharge behavior of pentacenetetrone (e.g., PTL 1). A naphthazarin dilithium salt that, in view of these findings, has an expanded conjugated system of a 1,4-benzoquinone, and that is in the form of a lithium salt:

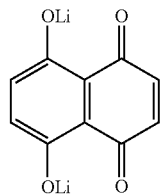

exhibits a low sublimation tendency, and is capable of undergoing a 4-electron-transfer redox reaction, with its stoichiometric capacity being 530 mAh/g, which is higher than the stoichiometric capacity of 1,4-benzoquinones of 496 mAh/g. However, the actually obtainable capacity is about half the stoichiometric value, and the cycle characteristics are also insufficient.

CITATION LIST

Patent Literature

PTL 1: JP2012-155884

SUMMARY OF INVENTION

Technical Problem

The low charge-and-discharge characteristics of the naphthazarin dilithium salt are due to the dissolution of the active material in the electrolyte during charge and discharge. Additionally, the ring condensation at redox sites improves the cycle characteristics but lowers the voltage when ring condensation occurs in a conjugated system.

From these viewpoints, an object of the present invention is to provide an electrode active material for non-aqueous secondary batteries that is less likely to dissolve in an electrolyte during charge and discharge, and that exhibits an excellent discharge capacity and excellent charge-and-discharge cycle characteristics.

Solution to Problem

The present inventors conducted extensive research to achieve the object, and found that a compound formed such that naphthazarin skeletons are condensed with a non-conjugated ring such as a dithiin ring solves the problem described above, and provides an electrode active material for non-aqueous secondary batteries that is less likely to dissolve in an electrolyte during charge and discharge, and that exhibits an excellent discharge capacity and excellent charge-and-discharge cycle characteristics. After conducting further research based on these findings, the inventors completed the present invention. Specifically, the present invention includes the following subject matter.

Item 1.

An electrode active material for non-aqueous secondary batteries, the electrode active material comprising a compound represented by formula (1):

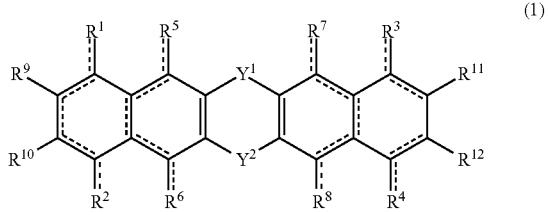

wherein $Y^1$ and $Y^2$ are identical or different and represent an oxygen atom, a sulfur atom, or a selenium atom, $R^1$ to $R^8$ are identical or different and represent an oxygen atom or a group represented by —OLi, $R^9$ to $R^{12}$ are identical or different and represent a hydrogen atom or an organic group, and bonds that are each represented by a solid line and a dashed line indicate a single bond or a double bond.

Item 2.

The electrode active material for non-aqueous secondary batteries according to item 1, wherein $Y^1$ and $Y^2$ in formula (1) are both a sulfur atom.

Item 3.

The electrode active material for non-aqueous secondary batteries according to item 1 or 2, wherein $R^1$ to $R^4$ are identical, and $R^5$ to Ware identical in formula (1).

Item 4.

The electrode active material for non-aqueous secondary batteries according to any one of items 1 to 3, wherein $R^9$ to $R^{12}$ are identical or different and represent a hydrogen atom, an alkyl group, an alkoxy group, an aryl group, or a carboxy group in formula (1).

Item 5.

The electrode active material for non-aqueous secondary batteries according to any one of items 1 to 4, wherein the electrode active material is a cathode active material for non-aqueous secondary batteries, the cathode active material comprising a compound represented by formula (1A):

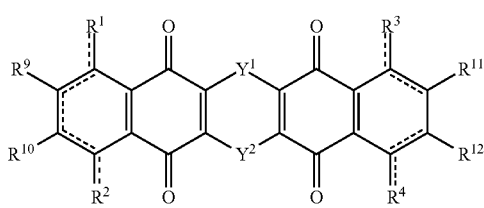

(1A)

wherein $Y^1$, $Y^2$, $R^1$ to $R^4$, and $R^9$ to $R^{12}$ are as defined above, and bonds that are each represented by a solid line and a dashed line indicate a single bond or a double bond.

Item 6.

The electrode active material for non-aqueous secondary batteries according to any one of items 1 to 4, wherein the electrode active material is an anode active material for non-aqueous secondary batteries, the anode active material comprising a compound represented by formula (1B):

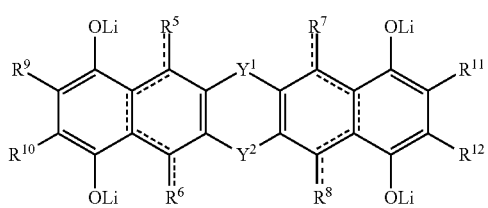

(1B)

wherein $Y^1$, $Y^2$, and $R^5$ to $R^{12}$ are as defined above, and bonds that are each represented by a solid line and a dashed line indicate a single bond or a double bond.

Item 7.

An electrode for non-aqueous secondary batteries, the electrode comprising the electrode active material for non-aqueous secondary batteries of any one of items 1 to 6.

Item 8.

A non-aqueous secondary battery comprising the electrode for non-aqueous secondary batteries of item 7.

Item 9.

The non-aqueous secondary battery according to item 8, wherein the non-aqueous secondary battery is a rocking-chair battery.

Advantageous Effects of Invention

Due to its wide molecular plane and strong π-π interaction between molecules, the electrode active material for non-aqueous secondary batteries according to the present invention is resistant to dissolution in an electrolyte caused by charge and discharge, and exhibits improved cycle characteristics.

The electrode active material for non-aqueous secondary batteries according to the present invention, due to the presence of an oxygen atom, a sulfur atom, or a selenium atom of the $sp^3$ structure, has its conjugated system cut off. Thus, decreases in voltage caused by ring condensation is unlikely to occur. The electrode active material for non-aqueous secondary batteries according to the present invention also has 8 Li ions inserted per molecule during discharge, and the valence of the molecule accordingly varies between −8 to 0. Thus, the electrode active material for non-aqueous secondary batteries according to the present invention exhibits a discharge capacity of 400 mAh/g or more, which is attributed to the reaction involving 8 electrons per molecule. This value is nearly three times the discharge capacity of 140 mAh/g of lithium cobalt oxide, which is an existing cathode material for lithium secondary batteries.

DESCRIPTION OF EMBODIMENTS

Figure 1:
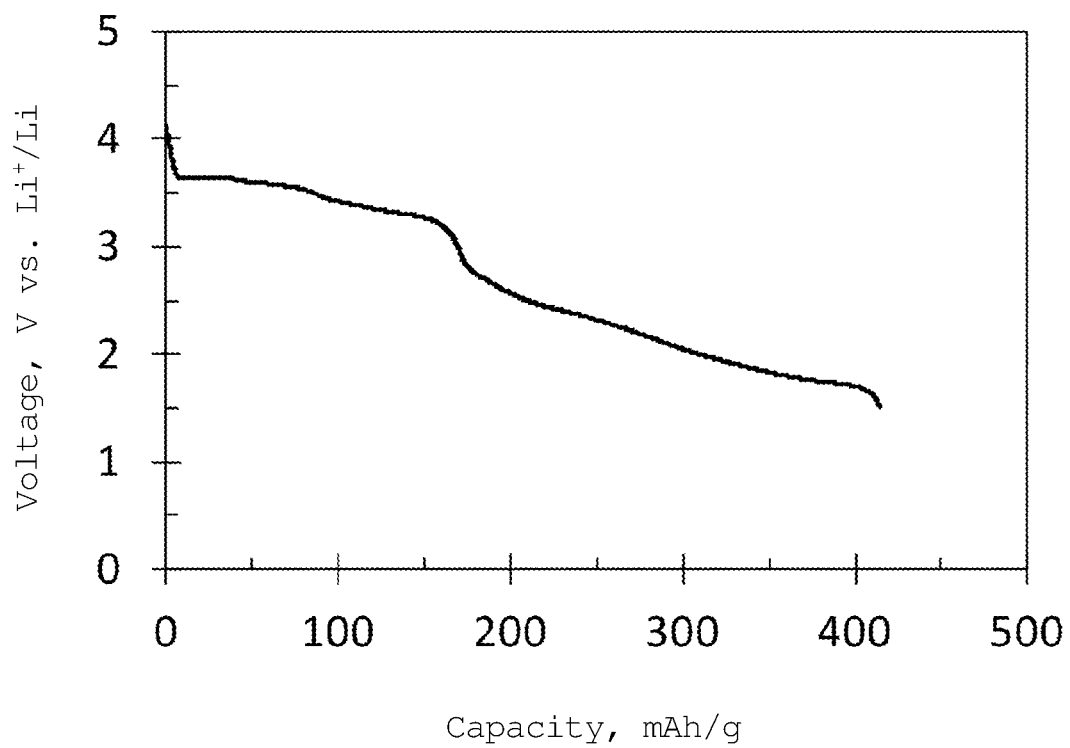
FIG. 1 is a graph illustrating the results of Test Example 1 (a charge-and-discharge test on a half-cell containing the compound of Example 1 as a cathode active material: initial discharge curve).

1. Electrode Active Material for Non-Aqueous Secondary Batteries

The electrode active material for non-aqueous secondary batteries according to the present invention comprises a compound represented by formula (1):

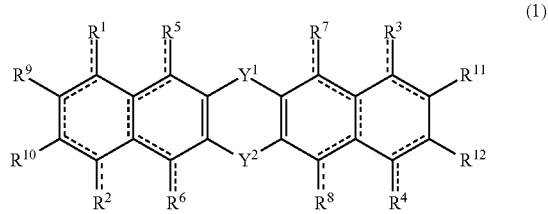

(1)

wherein $Y^1$ and $Y^2$ are identical or different and represent an oxygen atom, a sulfur atom, or a selenium atom, $R^1$ to $R^8$ are identical or different and represent an oxygen atom or a group represented by —OLi, $R^9$ to $R^{12}$ are identical or different and represent a hydrogen atom or an organic group, and bonds that are each represented by a solid line and a dashed line indicate a single bond or a double bond.

In formula (1), $Y^1$ and $Y^2$ each represent an oxygen atom, a sulfur atom, or a selenium atom. The electrode active material for non-aqueous secondary batteries according to the present invention, due to the presence of an oxygen atom, a sulfur atom, or a selenium atom of $sp^3$ structure, has its conjugated system cut off; and decreases in voltage caused by ring condensation is thus unlikely to occur. From the standpoint of greater prevention of decreases in voltage and greater improvement in capacity (in particular, discharge capacity), a sulfur atom is preferable. Although $Y^1$ and $Y^2$ may be identical or different, $Y^1$ and $Y^2$ are preferably identical from the standpoint of simplicity of synthesis.

The organic group represented by $R^9$ to $R^{12}$ in formula (1) includes alkyl, alkoxy, aryl, and carboxy.

The alkyl as the organic group represented by $R^9$ to $R^{12}$ in formula (1) is preferably alkyl having 1 to 6 carbon atoms (in particular 1 to 4), such as methyl, ethyl, n-propyl, isopropyl, n-butyl, isobutyl, sec-butyl, and tert-butyl. The alkyl for use may be either linear alkyl or branched alkyl. This alkyl may also be substituted. The substituents are not particularly limited, and include hydroxy and halogen (e.g., a fluorine atom, a chlorine atom, a bromine atom, and an iodine atom). For such substituted alkyl, the number of substituents is not particularly limited, and is, for example, 1 to 3.

The alkoxy as the organic group represented by $R^9$ to $R^{12}$ in formula (1) is preferably alkoxy having 1 to 6 carbon atoms (in particular 1 to 4), such as methoxy, ethoxy, n-propoxy, isopropoxy, n-butyloxy, isobutyloxy, sec-butyloxy, and tert-butyloxy. The alkoxy for use may be either linear alkoxy or branched alkoxy. This alkoxy may also be substituted. The substituents are not particularly limited, and include hydroxy and halogen (e.g., a fluorine atom, a chlorine atom, a bromine atom, and an iodine atom). For such substituted alkoxy, the number of substituents is not particularly limited, and is, for example, 1 to 3.

Examples of the aryl as the organic group represented by $R^9$ to $R^{12}$ in formula (1) include phenyl, naphthyl, anthranil, phenanthryl, biphenyl, and pyridyl. This aryl may also be substituted. The substituents are not particularly limited, and include hydroxy and halogen (e.g., a fluorine atom, a chlorine atom, a bromine atom, and an iodine atom). For such substituted aryl, the number of substituents is not particularly limited, and is, for example, 1 to 3.

$R^9$ to $R^{12}$ in formula (1) are preferably a hydrogen atom, from the standpoint of simplicity of synthesis, capacity, and charge-and-discharge cycle characteristics.

$R^1$ to $R^8$ in formula (1) each represent an oxygen atom or a group represented by —OLi. Although $R^1$ to $R^8$ may be identical or different, it is preferred that $R^1$ to $R^4$ are identical, while $R^5$ to $R^8$ are identical, from the standpoint of simplicity of synthesis, capacity, and charge-and-discharge cycle characteristics.

In the full charge mode, $R^1$ to $R^8$ in the electrode active material for non-aqueous secondary batteries according to the present invention are all an oxygen atom, and a compound represented by formula (1-1) is likely to form:

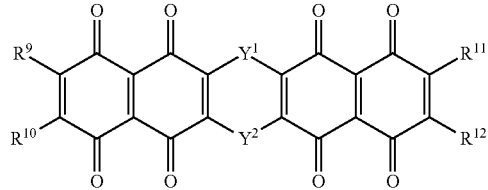

wherein $Y^1$, $Y^2$, and $R^9$ to $R^{12}$ are as defined above.

As discharge proceeds, a lithium atom is inserted into some of the oxygen atoms to form a compound represented by formula (1-2):

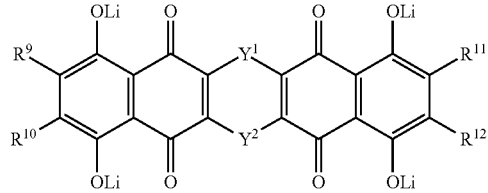

wherein $Y^1$, $Y^2$, and $R^9$ to $R^{12}$ are as defined above. Further, when the discharge is performed completely thereafter, $R^1$ to $R^8$ all become a group represented by —OLi, and a compound represented by formula (1-3) is likely to form:

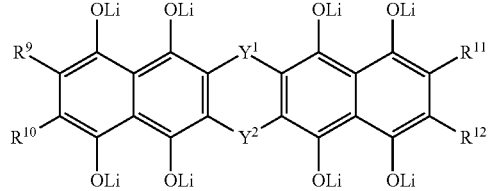

wherein $Y^1$, $Y^2$, and $R^9$ to $R^{12}$ are as defined above.

Of these compounds represented by formulas (1-1) to (1-3), the compounds represented by formula (1-1) and (1-2) can have a lithium atom inserted into an oxygen atom to have a group represented by —OLi. Thus, the compounds represented by formulas (1-1) and (1-2) are usable in a reaction of inserting a lithium atom (i.e., usable as a cathode active material for non-aqueous secondary batteries). Accordingly, a compound represented by formula (1A) is usable as a cathode active material for non-aqueous secondary batteries:

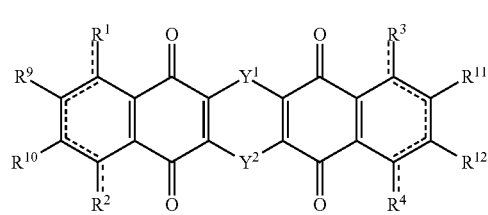

wherein $Y^1$, $Y^2$, $R^1$ to $R^4$, and $R^9$ to $R^{12}$ are as defined above, and bonds that are each represented by a solid line and a dashed line indicate a single bond or a double bond.

Of these compounds represented by formulas (1-1) to (1-3), the compounds represented by formulas (1-2) and (1-3) can release a lithium atom from the group represented by —OLi to leave an oxygen atom. Thus, the compounds represented by formulas (1-2) and (1-3) are usable in a reaction of releasing a lithium atom (i.e., usable as an anode active material for non-aqueous secondary batteries). Accordingly, a compound represented by formula (1B) is usable as an anode active material for non-aqueous secondary batteries:

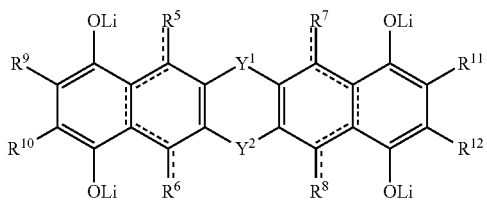

(1B)

wherein $Y^1$, $Y^2$, and $R^5$ to $R^{12}$ are as defined above, and bonds that are each represented by a solid line and a dashed line indicate a single bond or a double bond.

As described above, the compound represented by formula (1-2) is usable both as a cathode active material and as an anode active material for non-aqueous secondary batteries. Specifically, the use of the compound represented by formula (1-2) as a cathode active material and an anode active material enables the production of a non-aqueous secondary battery in which the same material is used in the active material of both electrodes.

Examples of electrode active materials for non-aqueous secondary batteries according to the present invention that satisfy the conditions described above include the following:

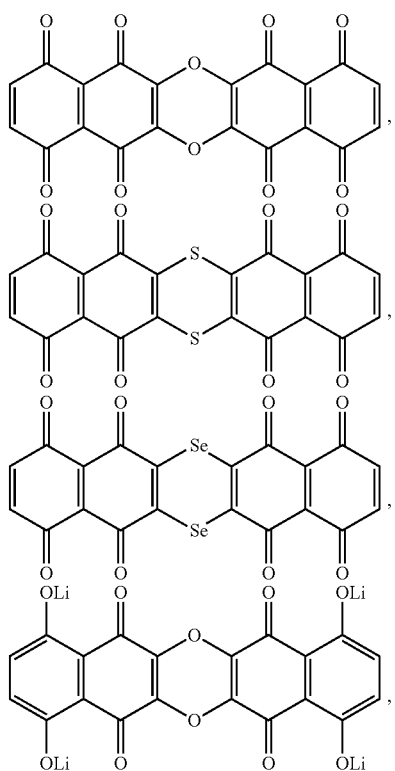

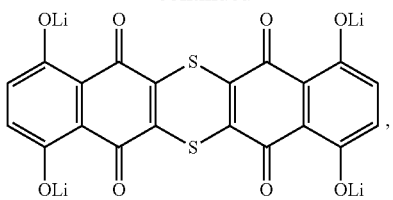

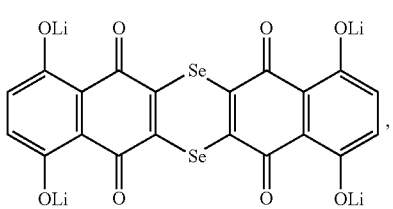

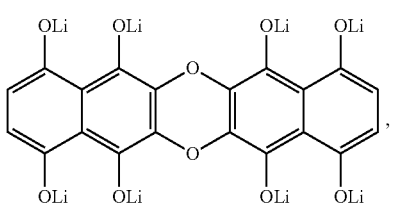

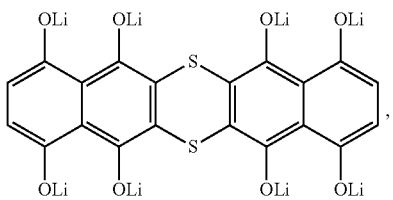

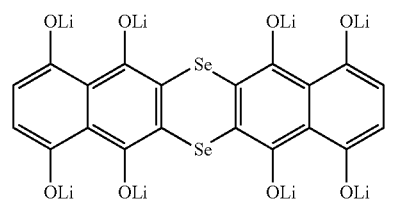

Such an electrode active material for non-aqueous secondary batteries according to the present invention that satisfies the conditions described above is a compound that is less likely to dissolve in an electrolyte during charge and discharge, and that exhibits excellent charge-and-discharge cycle characteristics. Due to its wide molecular plane and strong π-π interaction between molecules, the electrode active material for non-aqueous secondary batteries according to the present invention is resistant to dissolution in an organic electrolyte caused by charge and discharge, and exhibits improved charge-and-discharge cycle characteristics.

The electrode active material for non-aqueous secondary batteries according to the present invention is a known compound, or can be synthesized through a known reaction.

For example, the compound represented by formula (1-2) can be synthesized through the following reaction scheme 1.

Reaction Scheme 1

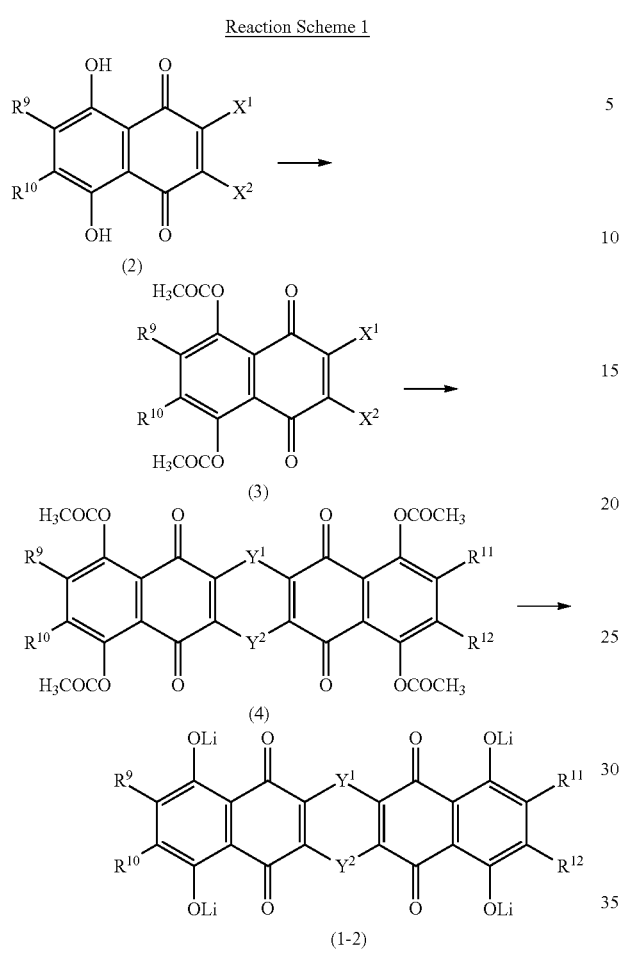

2. Non-Aqueous Secondary Battery

A non-aqueous secondary battery containing the electrode active material for non-aqueous secondary batteries according to the present invention can be produced by a known technique. Such a non-aqueous secondary battery can have the formation and structure used in traditionally known non-aqueous secondary batteries, except that the electrode active material for non-aqueous secondary batteries according to the present invention is used as a cathode active material and/or as an anode active material. Typically, the non-aqueous secondary battery according to the present invention contains a cathode, an anode, a non-aqueous electrolyte, and a separator.

The present invention also allows, as described later, the compound represented by formula (1A), which is an electrode active material for non-aqueous secondary batteries according to the present invention, to be used as a cathode active material and the compound represented by formula (1B), which is an electrode active material for non-aqueous secondary batteries according to the present inventions, to be used as an anode active material.

For example, when the compound represented by formula (1-2) is used in both the cathode active material and the anode active material, lithium is released in the cathode during charge to thereby form the compound represented by formula (1-1), while lithium is inserted in the anode to form the compound represented by formula (1-3). During discharge, the reverse reaction occurs in each electrode.

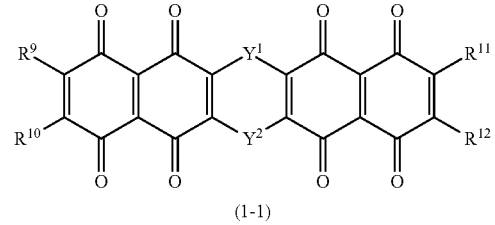

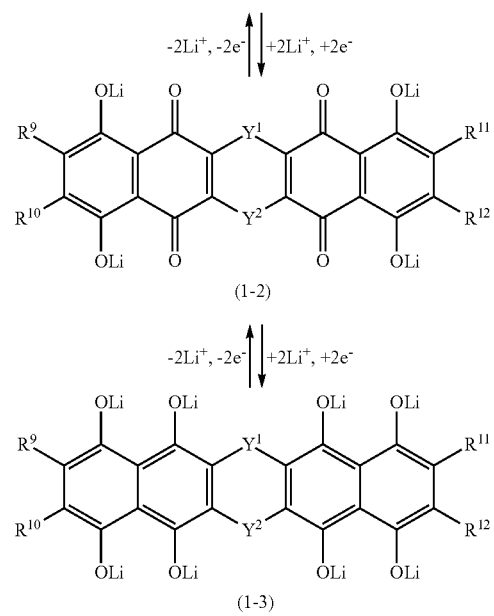

wherein $Y^1$, $Y^2$, and $R^9$ to $R^{12}$ are as defined above; and $X^1$ and $X^2$ are identical or different, and each represents a halogen atom.

The halogen atom represented by $X^1$ or $X^2$ in reaction scheme 1 includes a fluorine atom, a chlorine atom, a bromine atom, and an iodine atom.

First, a diacetoxy dihalonaphthoquinone compound (3) is prepared from a dihalo dihydroxy naphthoquinone compound (2) (starting material) by a known method (e.g., by dissolving compound (2) in acetic acid). Thereafter, the diacetoxy dihalonaphthoquinone compound (3) and rubeanic acid are reacted in a solvent (e.g., dimethylformamide) in the presence of a base (e.g., an amine compound, such as triethylamine), thereby preparing a tetraacetoxy dibenzo thianthrene tetrone (4). The tetraacetoxy dibenzo thianthrene tetrone is further reacted with a lithium compound (e.g., lithium hydroxide), thereby preparing the compound represented by formula (1-2). The reaction conditions are not particularly limited, and may be those typically used. When, instead of a sulfur atom, an oxygen atom or a selenium atom is used for $Y^1$ and $Y^2$, the use of a suitable oxygen compound or selenium compound, instead of rubeanic acid, provides the compound represented by formula (1-2). An electrode active material for non-aqueous secondary batteries according to the present invention other than the compound represented by formula (1-2) can also be synthesized through a known reaction in the same manner.

More specifically, the use of the electrode active material for non-aqueous secondary batteries according to the present invention involves an insertion-extraction reaction of lithium during charge and discharge. When the electrode active material for non-aqueous secondary batteries according to the present invention is used in both the cathode active material and the anode active material, ions that go in and out of both the cathode and the anode are lithium ions. Thus, it is possible to form a rocking chair non-aqueous secondary battery (in particular, a rocking chair lithium-ion secondary battery) that does not undergo changes in the concentration of the electrolyte during charge and discharge.

The concept of the "lithium-ion secondary battery," which is an embodiment of non-aqueous secondary batteries, in the present invention, includes "lithium secondary batteries" containing metallic lithium in the anode material Additionally, the concept of the "lithium-ion secondary battery," which is an embodiment of non-aqueous secondary batteries, in the present invention, also includes "non-aqueous lithium-ion secondary batteries" containing a non-aqueous electrolyte and "all-solid-state lithium-ion secondary batteries" containing a solid electrolyte.

(2-1) Cathode

The cathode may be configured such that a mixed cathode layer containing a cathode active material, a binder, etc., is formed on one surface or both surfaces of a cathode current collector.

This mixed cathode layer is prepared by adding the binder to the cathode active material and an optionally added conductive material, blending this mixture to form a sheet, and pressing this sheet onto the cathode current collector formed from a metal foil or other materials. The mixed cathode layer may also be prepared by adding the binder to the cathode active material and an optionally added conductive material, dispersing the mixture in an organic solvent to prepare a paste for forming a mixed cathode layer (in this case, the binder may be dissolved or dispersed in an organic solvent beforehand), applying the paste onto the surface (one surface or both surfaces) of the cathode current collector formed from a metal foil or other materials, drying the applied paste to form a mixed cathode layer, and optionally subjecting the layer to a processing step.

When the electrode active material for non-aqueous secondary batteries according to the present invention is used in the cathode active material, the electrode active material for use may be the compound represented by formula (1A). When the electrode active material for non-aqueous secondary batteries according to the present invention is not used in the cathode active material, the cathode active material for use is not particularly limited; instead, a material that allows charge and discharge to proceed at high potential can be used. Examples include lamellar oxides, such as $LiMnO_2$, $LiNiO_2$, $LiCoO_2$, $Li(Mn_xNi_{1-x})O_2$, $Li(Mn_xCo_{1-x})O_2$, $Li(Ni_yCo_{1-y})O_2$, and $Li(Mn_xNi_yCo_{1-x-y})O_2$; solid solutions, such as $Li_2MnO_3$—$LiNiO_2$, $Li_2MnO_3$—$LiCoO_2$, and $Li_2MnO_3$—$Li(Ni_yCo_{1-y})O_2$; silicates, such as $Li_2MnSiO_4$, $Li_2NiSiO_4$, $Li_2CoSiO_4$, $Li_2(Mn_xNi_{1-x})SiO_4$, $Li_2(Mn_xCo_{1-x})SiO_4$, $Li_2(NiCo_{1-y})SiO_4$, and $Li_2(Mn_xNiCo_{1-x-y})SiO_4$; borates, such as $LiMnBO_3$, $LiNiBO_3$, $LiCoBO_3$, $Li(Mn_xNi_{1-x})BO_3$, $Li(Mn_xCo_{1-x})BO_3$, $Li(Ni_yCo_{1-y})BO_3$, and $Li(Mn_xNi_yCo_{1-x-y})BO_3$; $V_2O_5$; $LiV_3O_6$; and MnO. In these formulas, $0<x<1$, $0<y<1$, and $0<x+y<1$. These cathode active materials can be used singly, or in a combination of two or more.

A conductive material for use may be, as with typical non-aqueous secondary batteries, graphite; carbon black (e.g., acetylene black and Ketjenblack); amorphous carbon materials, such as carbon materials prepared by forming amorphous carbon on the surface; fibrous carbon (e.g., vapor-grown carbon fiber and carbon fiber prepared by carbonization after spinning the pitch); and carbon nanotubes (a range of multi-walled or single-walled carbon nanotubes). For the conductive material for the cathode, these listed materials may be used singly, or in a combination of two or more.

Examples of binders include polyvinylidene fluoride (PVDF), polytetrafluoroethylene, polyacrylic acid, and styrene butadiene rubber.

The organic solvent for use in preparing a mixed cathode is not particularly limited, and examples include N-methylpyrrolidone (NMP). A paste can be formed from the organic solvent, a cathode active material, a binder, etc.

Regarding the formulation of the mixed cathode layer, it is preferred that, for example, the cathode active material be present in an amount of 40 to 80 mass %, and that the binder be present in an amount of 20 to 60 mass %. When a conductive material is used, it is preferred that the cathode active material be present in an amount of 20 to 60 mass %, that the binder be present in an amount of 5 to 20 mass %, and that the conductive material be present in an amount of 30 to 70 mass %. Additionally, the thickness of the mixed cathode layer is preferably 1 to 200 µm, per one surface of the current collector.

Examples of cathode current collectors for use include aluminum, stainless steel, nickel, and titanium; and foil, mesh, perforated metal, expanded metal, etc., that are formed from alloys of aluminum, stainless steel, nickel, or titanium. Typically, a stainless steel mesh that has a thickness of 10 to 200 µm is suitably used.

(2-2) Anode

The anode may be configured such that a mixed anode layer containing an anode active material, a binder, etc., is formed on one surface or both surfaces of a anode current collector. A non-aqueous secondary battery according to the present invention in the form of a metallic lithium secondary battery can use the metallic lithium as its anode.

This mixed anode layer can be prepared by adding the binder to the anode active material and an optionally added conductive material, blending the mixture to form a sheet, and pressing the sheet onto the anode current collector formed from a metal foil or other materials. The mixed anode layer may also be prepared by adding the binder to the anode active material and an optionally added conductive material, dispersing the mixture in an organic solvent to prepare a paste for forming a mixed anode layer (in this case, the binder may be dissolved or dispersed in an organic solvent beforehand), applying the paste onto the surface (one surface or both surfaces) of the anode current collector formed from a metal foil or other materials, drying the applied paste to form a mixed anode layer, and optionally subjecting the layer to a processing step.

When the electrode active material for non-aqueous secondary batteries according to the present invention is used in the anode active material, the electrode active material for use may be the compound represented by formula (1B). When the electrode active material for non-aqueous secondary batteries according to the present invention is not used in the anode active material, the anode active material for use is not particularly limited; examples of anode active materials for use include graphite (e.g., natural graphite and artificial graphite), sintering-resistant carbon, lithium metal, tin, silicon, alloys containing these materials, and SiO. Lithium metal, lithium alloy, or the like are preferably used in the active material for metallic lithium primary batteries and metallic lithium secondary batteries, while materials capable of doping and undoping lithium ions (e.g., graphite, including natural graphite and artificial graphite, and sintering-resistant carbon) are preferably used in the active material for lithium-ion secondary batteries. These anode active materials may be used singly, or in a combination of two or more.

A conductive material for use may be, as with typical non-aqueous secondary batteries, graphite; carbon black (e.g., acetylene black and Ketjenblack); amorphous carbon materials, such as carbon materials prepared by forming amorphous carbon on the surface; fibrous carbon (e.g., vapor-grown carbon fiber and carbon fiber prepared by carbonization after spinning the pitch); and carbon nanotubes (a range of multi-walled or single-walled carbon nanotubes). For the conductive material for the cathode, these listed substances may be used singly or in a combination of two or more.

Examples of binders include polyvinylidene fluoride (PVDF), polytetrafluoroethylene, polyacrylic acid, and styrene butadiene rubber.

The organic solvent for use in preparing a mixed anode is not particularly limited, and examples include N-methylpyrrolidone (NMP). A paste can be formed from the organic solvent, an anode active material, a binder etc.

Regarding the formulation of the mixed anode layer, it is preferred that, for example, the anode active material be present in an amount of 40 to 80 mass %, and that the binder be present in an amount of 20 to 60 mass %. When a conductive material is used, it is preferred that the anode active material be present in an amount of 20 to 60 mass %, that the binder be present in an amount of 5 to 20 mass %, and that the conductive material be present in an amount of 30 to 70 mass %. Additionally, the thickness of the mixed anode layer is preferably 1 to 200 per one surface of the current collector.

Examples of anode current collectors for use include aluminum, stainless steel, nickel, and titanium; and foil, mesh, perforated metal, expanded metal, etc., that are formed from alloys of aluminum, stainless steel, nickel, or titanium. Typically, a stainless steel mesh that has a thickness of 10 to 200 μm is suitably used.

(2-3) Non-Aqueous Electrolyte

A non-aqueous electrolyte for use may be a solution (organic electrolyte) prepared by dissolving a lithium salt, such as lithium perchlorate or $LiPF_6$, in a solvent formed of at least one known substance of, for example, ethylene carbonate, dimethyl carbonate, and diethyl carbonate. A solid electrolyte for use may also be an inorganic solid electrolyte (e.g., $Li_2S$—$P_2S_5$-based electrolyte and $Li_2S$—$GeS_2$—$P_2S_5$-based electrolyte).

(2-4) Separator

The cathode and the anode described above are used in the form of, for example, a laminated electrode prepared by laminating the cathode and the anode with an interjacent separator between them, or in the form of a spiral-wound electrode prepared by further winding the laminated electrode into a spiral shape.

The separator preferably has sufficient strength and can retain as much electrolyte as possible. From these viewpoints, the separator is preferably a microporous film, a non-woven fabric, a filter, etc., that has a thickness of 10 to 50 μm and a porosity of 30 to 70%, and that contains at least one of polyethylene, polypropylene, an ethylene-propylene copolymer, glass, and the like.

EXAMPLES

The following describes the present invention in detail with reference to Examples. However, the present invention is not limited to the Examples.

Example 1

1,4,8,11-Tetrahydroxy dibenzo[b,i]thianthrene-5,7,12,14-tetrone tetralithium salt (1) was synthesized through the following route. First, 0.93 g of 2,3-dichloro-5,8-dihydroxy-1,4-naphthoquinone was dissolved in 24 mL of acetic anhydride, and refluxed for 8 hours. After cooling, the precipitate was filtered, thereby obtaining 0.92 g of 5,8-diacetoxy-2,3-dichloro-1,4-naphthoquinone. 0.85 g of the synthesized 5,8-diacetoxy-2,3-dichloro-1,4-naphthoquinone and 0.17 g of rubeanic acid were dissolved in 13 mL of dimethylformamide, and then 1 mL of triethylamine was added thereto, followed by stirring at 50° C. for 10 hours. After cooling, the precipitate was filtered, and washed with water, thereby obtaining 0.72 g of 1,4,8,11-tetraacetoxy dibenzo[b,i]thianthrene-5,7,12,14-tetrone. Thereafter, 0.64 g of the obtained solid was dissolved in a lithium hydroxide solution, and stirred at room temperature for 2 hours. After evaporation of the solvent, the residue was washed with ethanol, thereby obtaining 0.39 g of 1,4,8,11-tetrahydroxy dibenzo [b,i]thianthrene-5,7,12,14-tetrone tetralithium salt: melting point: >400° C., $^1$H-NMR (400 MHz, DMSO-$d_6$):δ 6.54 (s, 4H).

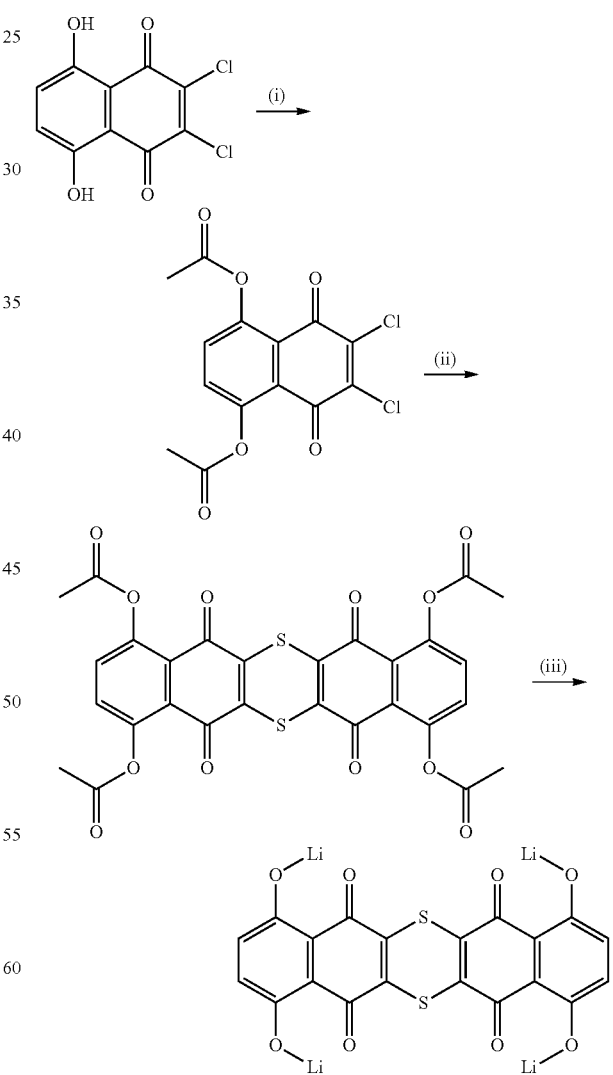

(i) Acetic Anhydride, (ii) Rubeanic Acid, (iii) Lithium Hydroxide

Comparative Example 1

A known cathode active material (a naphthazarin dilithium salt) was used as a cathode active material for Comparative Example 1.

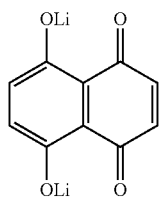

Test Example 1

Evaluation of Electrode (Half-Cell)

The compound synthesized in Example 1 (cathode active material) was mixed with acetylene black (conductive material) and FIFE (binder) in a ratio of 4:5:1 (active material: conductive material:binder on a mass basis) to prepare a sheet with a thickness of 90 μm. This sheet was pressed onto a stainless steel mesh (thickness: 100 μm), thereby preparing a cathode. Then, a coin-shaped cell for testing was prepared using this cathode for the cathode material, a lithium foil for the anode material, lithium bis(trifluoromethanesulfonyl)imide/tetrahydropyran (3 mol/L) for the electrolyte, and a glass filter for the separator. A charge-and-discharge test was performed on this cell in the atmosphere at 30° C. at a current density of 20 mA/g in the potential range of 1.5-4.2 V (vs. Li$^+$/Li).

FIG. 1 illustrates the initial discharge curve. The discharge curve has a two-stage flat potential part around 3.5 V (vs. Li$^+$/Li), and a one-stage flat potential part around 2 V (vs. Li$^+$/Li), indicating a multi-electron reaction. The initial discharge capacity was as high as 413 mAh/g, which is close to 462 mAh/g, the stoichiometric value in the reaction in which 8 electrons are assumed to migrate per molecule. The electrode had a discharge capacity almost three times the discharge capacity of lithium cobalt oxide (140 mAh/g), which is a cathode material of a typical lithium-ion secondary battery.

Figure 2:
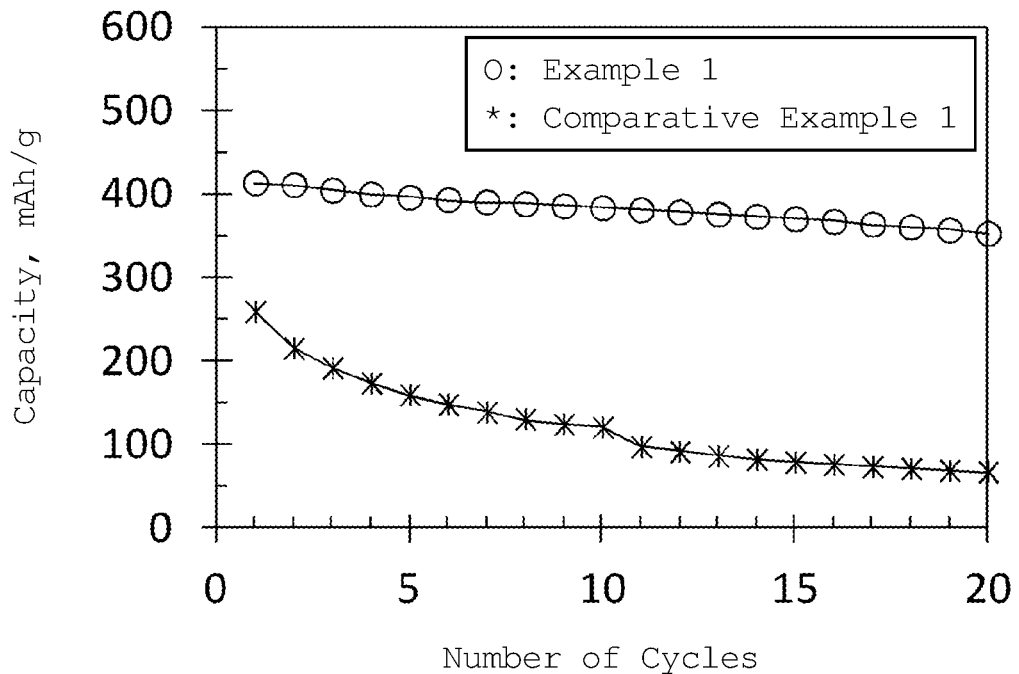
FIG. 2 is a graph illustrating the results of Test Example 1 (a charge-and-discharge test on half-cells containing the compound of Example 1 or Comparative Example 1 as a cathode active material: cycle characteristics).

FIG. 2 illustrates a comparison between the cycle change in the discharge capacity of an electrode prepared using compound (1) of Example 1 for the cathode active material and the cycle characteristics of an electrode prepared using a naphthazarin dilithium salt (the compound of Comparative Example 1) for the cathode active material. The cell containing the compound of Example 1 for the cathode active material exhibited a smaller decrease in capacity even when charge and discharge were repeated, and maintained a capacity of about 353 mAh/g after 20 cycles, exhibiting excellent cycle characteristics. In contrast, the cell containing a naphthazarin dilithium salt for the cathode active material exhibited an initial capacity of 259 mAh/g, which was about half of the stoichiometric value (530 mAh/g), and also exhibited a gradually decreasing discharge capacity as the number of cycles increased, with a capacity of 67 mAh/g after 20 cycles. It appears that because the compound of Example 1 has a wider molecular plane and stronger π-π interaction between molecules than the naphthazarin dilithium salt, the dissolution of the compound of Example 1 in the organic electrolyte caused by charge and discharge was reduced, and this led to improved cycle characteristics.

Test Example 2

Evaluation of Electrode (Rocking Chair Full-Cell)

Two electrodes were prepared using compound (1) of Example 1 for the active material as described above; and an full-cell was prepared using the electrodes, one in the cathode and the other in the anode. Lithium bis(trifluoromethanesulfonyl)imide/sulfolane (1 mol/L) was used for the electrolyte, and a glass filter was used for the separator. A charge-and-discharge test was performed on the prepared full-cell in the atmosphere at 30° C. at a current density of 20 mA/g, in the voltage range of 0.0-2.5 V (difference of electrical potential).

Figure 3:
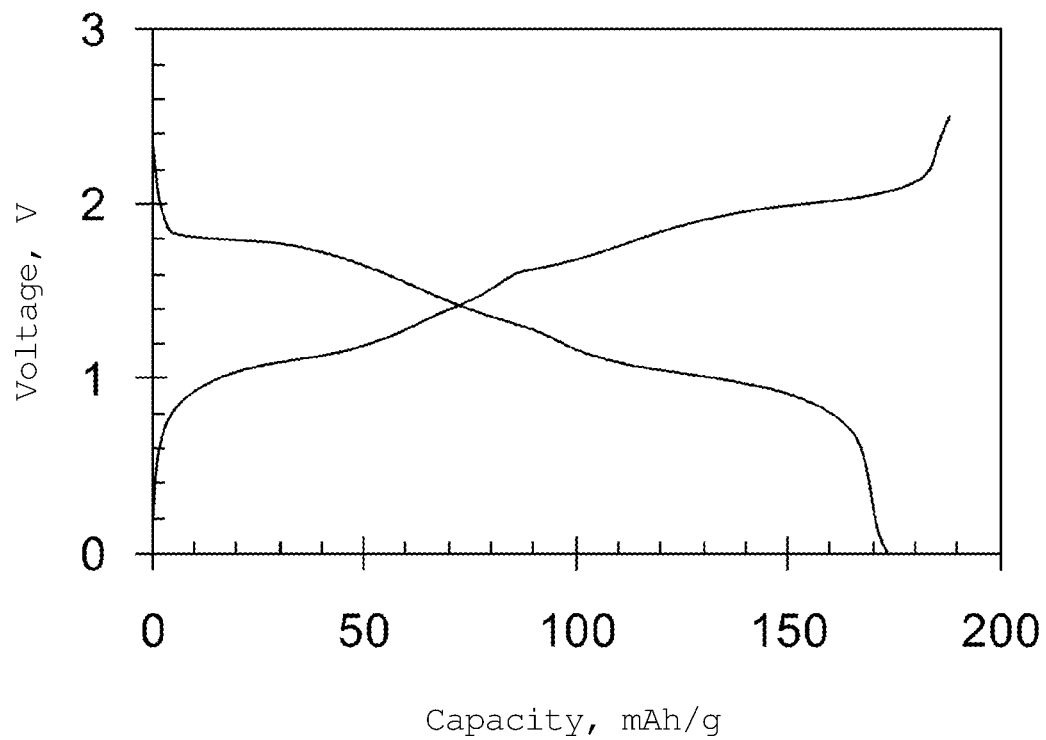
FIG. 3 is a graph illustrating the results of Test Example 2 (a charge-and-discharge test on an full-cell containing the compound of Example 1 as a cathode active material and as an anode active material: initial charge and discharge curve).
Figure 4:
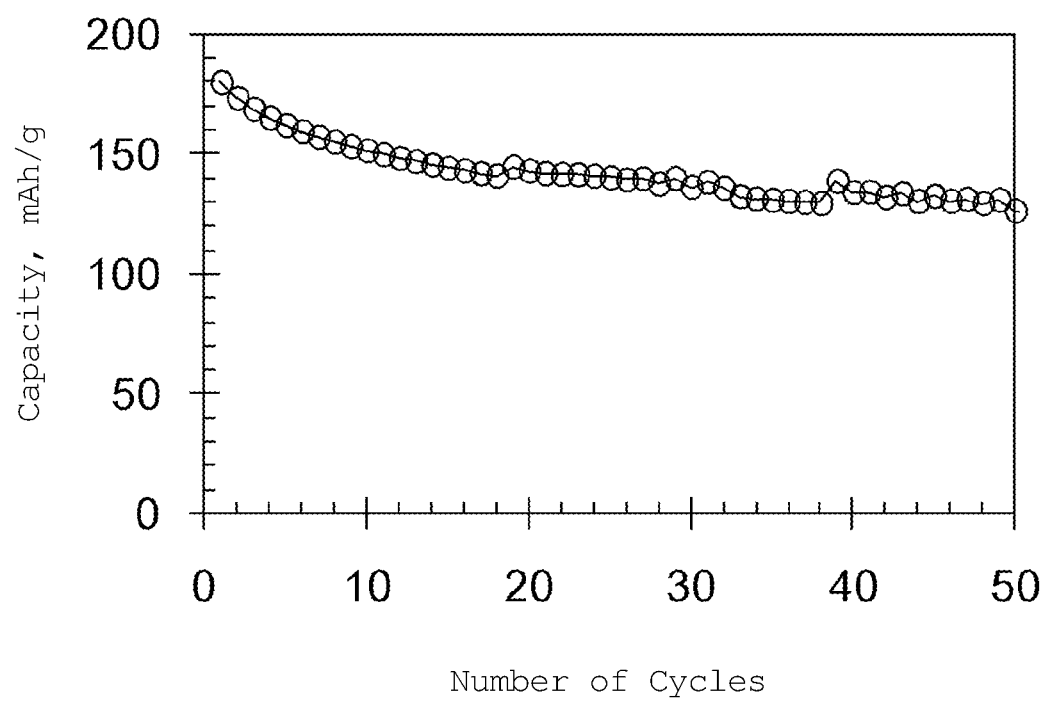
FIG. 4 is a graph illustrating the results of Test Example 2 (a charge-and-discharge test on an full-cell containing the compound of Example 1 as a cathode active material and as an anode active material: cycle characteristics).

FIG. 3 illustrates charge and discharge curves. The discharge curve also has a two-stage flat potential part, indicating a multi-electron reaction. The discharge capacity determined by FIG. 3 was 173 mAh/g, which is close to a stoichiometric value of 231 mAh/g in the reaction in which 4 electrons are assumed to migrate per molecule. The results reveal that compound (1) of Example 1 has the function of both the cathode active material and the anode active material. As illustrated in FIG. 4, the cycle characteristics were also relatively preferable.

The invention claimed is:

1. An electrode active material for non-aqueous secondary batteries, the electrode active material comprising a compound represented by formula (1):

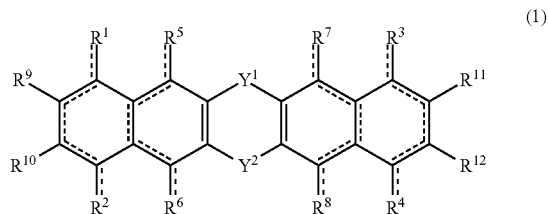

wherein $Y^1$ and $Y^2$ are identical or different and represent an oxygen atom, a sulfur atom, or a selenium atom, $R^1$ to $R^8$ are identical or different and represent an oxygen atom or a group represented by —OLi, $R^9$ to $R^{12}$ are identical or different and represent a hydrogen atom or an organic group, and bonds that are each represented by a solid line and a dashed line indicate a single bond or a double bond.

2. The electrode active material for non-aqueous secondary batteries according to claim 1, wherein $Y^1$ and $Y^2$ in formula (1) are both a sulfur atom.

3. The electrode active material for non-aqueous secondary batteries according to claim 1, wherein $R^1$ to $R^4$ are identical, and $R^5$ to $R^8$ are identical in formula (1).

4. The electrode active material for non-aqueous secondary batteries according to claim 1, wherein $R^9$ to $R^{12}$ are identical or different and represent a hydrogen atom, an alkyl group, an alkoxy group, an aryl group, or a carboxy group in formula (1).

5. The electrode active material for non-aqueous secondary batteries according to claim 1, wherein the electrode active material is a cathode active material for non-aqueous secondary batteries, the cathode active material comprising a compound represented by formula (1A):

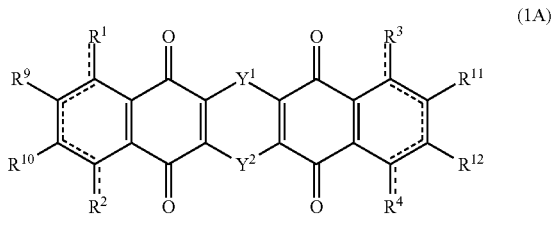

(1A)

wherein $Y^1$, $Y^2$, $R^1$ to $R^4$, and $R^9$ to $R^{12}$ are as defined above, and bonds that are each represented by a solid line and a dashed line indicate a single bond or a double bond.

6. The electrode active material for non-aqueous secondary batteries according to claim 1, wherein the electrode active material is an anode active material for non-aqueous secondary batteries, the anode active material comprising a compound represented by formula (1B):

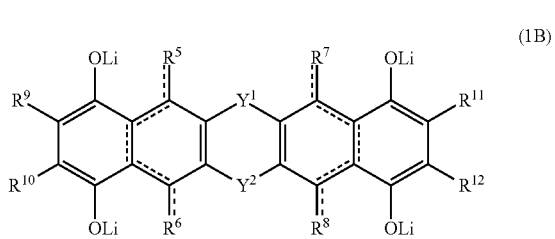

(1B)

wherein $Y^1$, $Y^2$, and $R^5$ to $R^{12}$ are as defined above, and bonds that are each represented by a solid line and a dashed line indicate a single bond or a double bond.

7. An electrode for non-aqueous secondary batteries, the electrode comprising the electrode active material for non-aqueous secondary batteries of claim 1.

8. A non-aqueous secondary battery comprising the electrode for non-aqueous secondary batteries of claim 7.

9. The non-aqueous secondary battery according to claim 8, wherein the non-aqueous secondary battery is a rocking-chair battery.

10. The electrode active material for non-aqueous secondary batteries according to claim 2, wherein $R^1$ to $R^4$ are identical, and $R^5$ to $R^8$ are identical in formula (1).

11. The electrode active material for non-aqueous secondary batteries according to claim 2, wherein $R^9$ to $R^{12}$ are identical or different and represent a hydrogen atom, an alkyl group, an alkoxy group, an aryl group, or a carboxy group in formula (1).

12. The electrode active material for non-aqueous secondary batteries according to claim 3, wherein $R^9$ to $R^{12}$ are identical or different and represent a hydrogen atom, an alkyl group, an alkoxy group, an aryl group, or a carboxy group in formula (1).

13. The electrode active material for non-aqueous secondary batteries according to claim 2, wherein the electrode active material is a cathode active material for non-aqueous secondary batteries, the cathode active material comprising a compound represented by formula (1A):

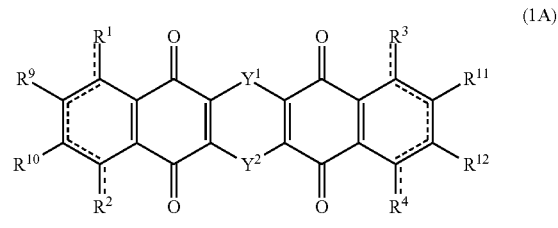

(1A)

wherein $Y^1$, $Y^2$, $R^1$ to $R^4$, and $R^9$ to $R^{12}$ are as defined above, and bonds that are each represented by a solid line and a dashed line indicate a single bond or a double bond.

14. The electrode active material for non-aqueous secondary batteries according to claim 3, wherein the electrode active material is a cathode active material for non-aqueous secondary batteries, the cathode active material comprising a compound represented by formula (1A):

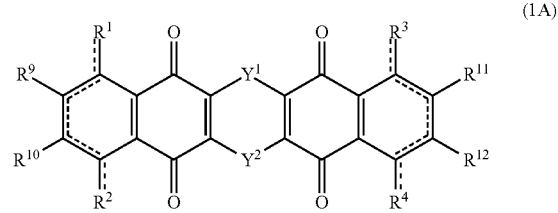

(1A)

wherein $Y^1$, $Y^2$, $R^1$ to $R^4$, and $R^9$ to $R^{12}$ are as defined above, and bonds that are each represented by a solid line and a dashed line indicate a single bond or a double bond.

15. The electrode active material for non-aqueous secondary batteries according to claim 4, wherein the electrode active material is a cathode active material for non-aqueous secondary batteries, the cathode active material comprising a compound represented by formula (1A):

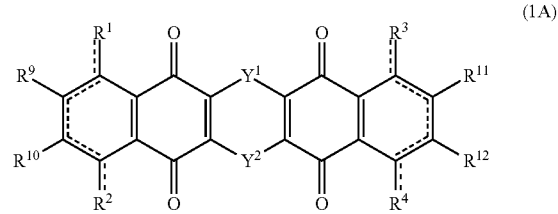

(1A)

wherein $Y^1$, $Y^2$, $R^1$ to $R^4$, and $R^9$ to $R^{12}$ are as defined above, and bonds that are each represented by a solid line and a dashed line indicate a single bond or a double bond.

16. The electrode active material for non-aqueous secondary batteries according to claim 2, wherein the electrode active material is an anode active material for non-aqueous secondary batteries, the anode active material comprising a compound represented by formula (1B):

(1B)

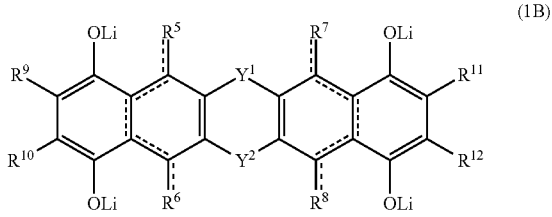

wherein $Y^1$, $Y^2$, and $R^5$ to $R^{12}$ are as defined above, and bonds that are each represented by a solid line and a dashed line indicate a single bond or a double bond.

17. The electrode active material for non-aqueous secondary batteries according to claim 3, wherein the electrode active material is an anode active material for non-aqueous secondary batteries, the anode active material comprising a compound represented by formula (1B):

(1B)

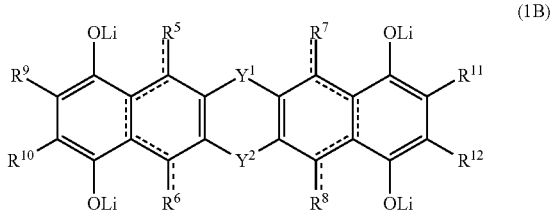

wherein $Y^1$, $Y^2$, and $R^5$ to $R^{12}$ are as defined above, and bonds that are each represented by a solid line and a dashed line indicate a single bond or a double bond.

18. The electrode active material for non-aqueous secondary batteries according to claim 4, wherein the electrode active material is an anode active material for non-aqueous secondary batteries, the anode active material comprising a compound represented by formula (1B):

(1B)

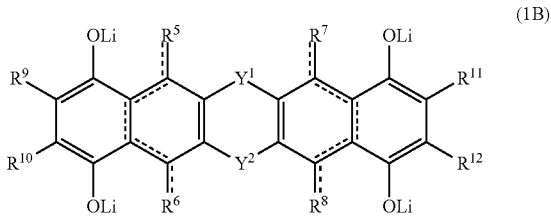

wherein $Y^1$, $Y^2$, and $R^5$ to $R^{12}$ are as defined above, and bonds that are each represented by a solid line and a dashed line indicate a single bond or a double bond.

19. An electrode for non-aqueous secondary batteries, the electrode comprising the electrode active material for non-aqueous secondary batteries of claim 2.

20. An electrode for non-aqueous secondary batteries, the electrode comprising the electrode active material for non-aqueous secondary batteries of claim 3.

* * * * *